Figure 1:
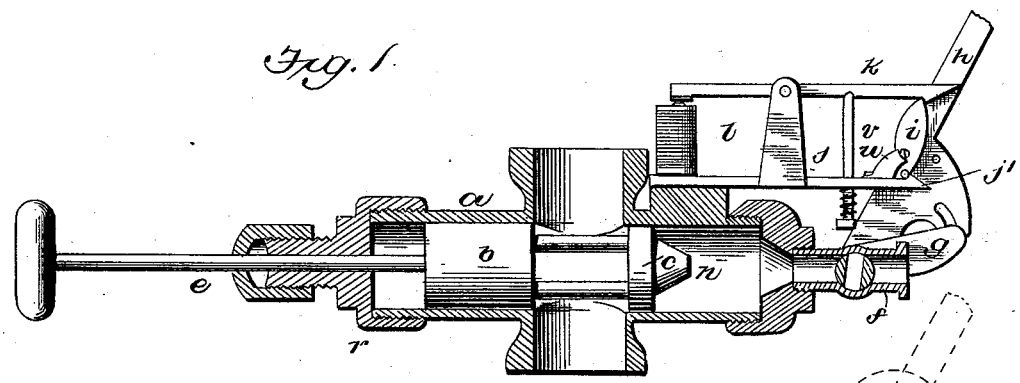

(No Model.)

J. E. STANNARD
THROTTLE VALVE.

No. 509,334. Patented Nov. 21, 1893.

Witnesses
Fred A Bearse
O. C. Stickney

Inventor
John E. Stannard
By Allen Webster

UNITED STATES PATENT OFFICE.

JOHN E. STANNARD, OF SPRINGFIELD, MASSACHUSETTS, ASSIGNOR OF ONE-HALF TO FRANCIS J. MILLEA, OF SAME PLACE.

THROTTLE-VALVE.

SPECIFICATION forming part of Letters Patent No. 509,334, dated November 21, 1893.

Application filed November 17, 1892. Serial No. 452,301. (No model.)

*To all whom it may concern:*

Be it known that I, JOHN E. STANNARD, a citizen of the United States of America, residing in Springfield, in the county of Hampden and State of Massachusetts, have invented new and useful Improvements in Throttle-Valves, of which the following is a specification, reference being had to the accompanying drawings and letters of reference marked thereon.

In the drawings like letters of reference indicate like parts.

Figure 2:
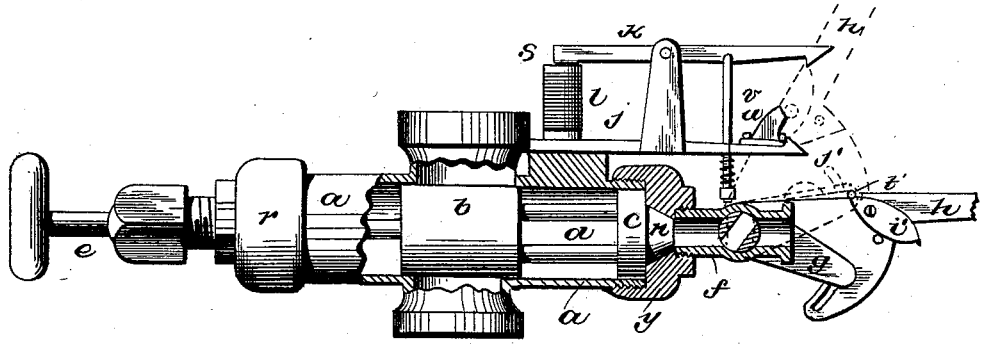
Figure 3:
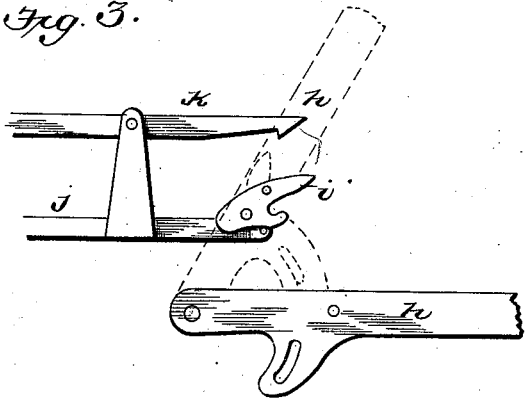

Figure 1 is a side view with the shell in section, illustrating my invention with the valve open. Fig. 2 is a side view with a part of the shell in section showing the valve closed, and Fig. 3 is a detached view of a modification of a part of the mechanism.

In detail $a$ indicates the valve shell; $b$ a shut-off plug fitting therein; $c$ a disk of said plug; $d$ rods connecting the disk $c$ of the valve with the shut-off plug $b$; $e$ a stem; $f$ a plug cock; $g$ an arm mounted upon the plug; $h$ a lever; $i$ a dog; $j$ a supporting arm; $k$ a catch; and $l$ a magnetic coil or electro-magnet.

The object of my invention is to provide a device, by the employment of which the steam, air, gas or water may be immediately shut off, and especially to shut off steam from an engine when in operation, so that in the event of an accident or for other cause, the same may be stopped without the delay occasioned by communicating with the engineer, and for that purpose I arrange a system of levers provided with weights or springs, so that upon their being released, they will operate to close the valve, and thus stop the movement of the engine.

Although the device may be operated by compressed air, a pull or other devices, I prefer to operate the device by the employment of an electro-magnet, and to place an ordinary push button in each room at some convenient place, so that all that requires to be done when it becomes desirable to stop the engine, is simply to press the button.

In the construction of my device, I prefer to employ what might be termed a "four-way-branch construction." The steam inlet and outlet are indicated by arrows, and for a shut-off to close the steam passage, I may employ a valve body or plug, having an opening through it, or I may employ the construction illustrated in the drawings, the difference between it and the ordinary plug with an opening for the passage of the steam consisting principally in cutting away all the material excepting three or four connecting rods $d$. By the employment of this construction, I am enabled to leave the steam-way practically open, while I at the same time maintain the smaller end or disk $c$ rigidly in its position, and the opening for the passage of the steam is practically a straight-way opening.

Attached to the end of the shut-off plug $b$ I provide the rod or stem $e$, its office being to replace the valve plug in the desired open position after it has been closed by the operation of the stem as hereinafter described. The opposite end of the shell is provided with an opening into which I secure a plug-cock $f$, the interior of the part into which the plug-cock is secured being preferably provided with a cone-seat, and the face of the disk $c$ toward said seat being provided with a tapering plug $n$ to fit within the cone-seat.

Mounted upon the end of the plug in the plug-cock I arrange the lever $g$, and adjacent thereto I mount the lever $h$, the latter being provided with a weight $o$ and so arranged that upon the lever $h$ turning upon its pivot, it will be practically unobstructed during the first portion of its downward movement, after which it engages the lever $g$ with sufficient force to turn it and with it the plug, so as to open the outlet passage through the plug-cock.

The valve is set normally in the position indicated in Fig. 1, and when the plug cock for any cause is turned to open the passage-way through it, the steam will rush through the opening or channel $p$ in the shell into the chamber formed between the head of the valve $b$ and the inner face of the cap $r$, thus forcing the valve or plug toward the plug-cock end, and as the plug-cock is opened, there will be no resistance against such movement and the valve will be carried in the direction of the plug-cock until the valve $b$ entirely closes the steam passage and escape of steam through the plug-cock is prevented by the cone shaped valve $n$ entering its seat and closing the opening into the plug-cock, the pressure of steam operating to maintain the same tightly upon its seat. It will readily be seen that the same result obtains whether the plug-cock be opened by one mechanical device or another.

The appliance illustrated by me for the operation of the plug-cock consists of a weighted arm $h$ arranged to have free movement after being released for a part of its downward traverse, and then it engages a pin upon the arm $g$, so that the impetus acquired during a portion of the movement of the weight and arm is utilized for the purpose of moving the lever or arm $g$, and thereby turning the plug in the plug-cock.

It will, of course, readily be seen that various other forms of valves may be utilized and operated for the same purpose as the plug-cock is utilized by me, but I deem it the simplest form of contrivance, and as the plugs are usually ground tightly to their seats and do not turn with freedom, I deem it advisable to employ the stored energy occasioned by the fall of the weighted lever for the purpose of insuring the positive action of the plug.

For a let-off motion or device, I prefer to employ an electro-magnet or magnetic coil $l$, and arrange above it an armature arm $k$, upon which is mounted a soft iron plate $s$, which upon a current of electricity being sent through the coil, will be drawn toward the core of the coil, and thereby turn the lever $k$ upon its pivot, and move the latch provided end away from the dog $i$, which dog is pivoted upon the lever $h$, and has a lower projecting part $t$, which, when in its closed position, bears against an abutment $u$.

I employ the dog $i$ for the purpose of reducing friction, and to lessen the strain upon the latch, as the strain or pressure would be greater if the latch upon the arm $k$ engaged the lever $h$ without the employment of intermediate mechanism.

The abutment $u$ and pivotal support for the lever $k$ are mounted upon a base or supporting plate $j$, the end of which is formed in a hook as shown at $j$, so that all danger of the engaging pin $t$ on the dog escaping by the dog being accidentally turned in the opposite direction is avoided, and the incline upon the latch portion $j'$ is such that upon the lever $h$ being raised to its first or normal position, the pin $t$ rides the incline upon the latch portion $j'$ until it engages the abutment $u$ which causes the dog to turn upon its pivot and its nose to be thrown against the latch upon the lever $k$, and thereby engaged and held. A rod $v$, which engages the lever $k$, is extended downwardly through the plate $j$ and a spiral spring $w$ mounted thereon is held in position by a nut which may be adjusted to regulate the downward strain of the lever $k$ as desired. This device maintains the lever in its normal position in engagement with or preparatory for engagement with the dog $i$. The tension exerted, however, by the spring $w$ is so regulated that it will not overcome the force exerted through the magnet to turn the lever $k$ upon its pivot and release the arm when the current is sent through the coil.

In Fig. 3 I have illustrated a modification in the form of the latch or dog $i$, the remainder of the apparatus being substantially the same as first described. In the latter form of construction the latch or dog $i$ is provided with an over-hanging lip $z$, and the dog is pivoted to the base $j$ instead of being mounted upon the lever $h$ as first described. This construction I find allows more back-lash without danger of the dog being disengaged from the latch $k$, and any jar which might affect the parts would operate upon the base part $j$ and the latch $k$ alike, and the tendency of disengagement be thereby avoided, and with the dog in a fixed pivotal position, the certainty of its return to its normal or elevated position when the lever $h$ is raised is greater than if it were compelled to travel with the lever and be carried to its normal position by engaging the inclined face of the latch portion of the base $j$ and engaging the abutment $u$.

Having, therefore, described my invention, what I claim, and desire to secure by Letters Patent, is—

1. The combination of a suitable shell or valve body, provided with an opening for the passage of steam, a shut-off plug $b$, having a portion $c$ arranged therein, a passage-way $p$ in the shell to allow the steam to enter the opening between the screw cap $r$ and the plug $b$, means arranged to open and close the outlet from the chamber formed between the portion $c$ and the screw cap $y$, whereby the steam upon the opening of said outlet is allowed to operate to carry the body of the plug across the steam-way and close the valve, substantially as and for the purposes stated.

2. The combination of the shell $a$, a plug $b$ having a disk $c$ arranged therein and having an opening for the passage of steam between the parts $b$ and $c$, a plug-cock $f$ mounted in one end of the valve body, a steam-way $p$ formed in the wall of the valve body at the opposite end portion, a lever $g$ mounted upon the plug, a lever $h$ pivotally mounted adjacent thereto, a weight arranged upon the lever $h$, a latch arranged to hold the lever $h$ in its raised position, and means to move said latch and release the lever and allow it to fall by gravity and engage the lever $g$, thereby turning the plug, substantially as and for the purposes stated.

3. The combination of a valve body $a$, provided with an inlet and outlet opening, a plug $b$ having a head $c$ connected therewith by intermediate rods $d$ and formed with a part $n$ upon its face, a valve as $f$ opening into the space between the disk $c$ and the screw cap $y$, a lever $g$ arranged to open the valve $f$ when turned, a lever $h$ mounted adjacent thereto, provided with a weight and arranged to engage the lever $g$ after having moved downwardly upon its pivot for a part of its traverse, a latch arranged to maintain the lever $h$ in its elevated position, and an electric appliance arranged to disengage the latch from and allow the lever $h$ to fall, substantially as and for the purposes stated.

4. The combination of the shell $a$, provided with a steam-way $o$, a valve plug $b$, having the disk $c$ connected thereto by intermediate rods $d$, a stem $e$ attached at its inner end to the plug $b$, a plug-cock $f$ mounted in the shell, a lever $g$ mounted upon the plug, a lever $h$ mounted adjacent thereto, a support $j$, an electric coil $i$ mounted thereon, a latch $k$ pivotally mounted and arranged with one end to engage the lever $h$ and its opposite end provided with an armature arranged adjacent to the core of the coil, a source of electrical energy and conducting wires, substantially as and for the purposes stated.

5. The combination of the shell $a$, a valve arranged therein to open or close the steam-passage, and provided at one end with a cone shaped plug $n$, a screw-cap $y$ mounted upon the valve shell, and provided with a cone-seat to receive the cone-plug $p$ and close the opening, a valve arranged in the screw-cap $y$, and means to open said valve, whereby the pressure of the steam operates to move the valve plug toward the screw-cap $y$ and carry the cone-plug $n$ to its seat, substantially as and for the purposes stated.

6. The combination of the shell $a$, provided with a steam-way $p$, a plug $b$ having a disk $c$ mounted thereon by means of intermediate rods $d$, a screw-cap $y$ mounted upon said shell, a valve $f$ mounted in said cap, a supporting plate $j$, having an abutment $u$ arranged thereon, and the coil $l$ mounted upon the plate $j$, a lever $h$ arranged to open the valve $f$, and having a dog $i$ mounted thereon, a latch $k$ pivotally mounted and arranged to engage the dog $i$ and having an armature $s$ mounted thereon and situated adjacent to the end of the core in the coil $l$, substantially as and for the purposes stated.

7. The combination with a shut-off valve of a lever $h$ automatically operative when free, a pivotally mounted dog $i$, a latch $k$ to engage the nose of the dog, and a projection upon the lever $h$ to engage the recess in the forward edge of the dog means to release the lever $h$ and means to cause it to move when free, said lever $h$ being arranged to cause the outlet valve $f$ to be opened by its movement, substantially as and for the purposes stated.

JOHN E. STANNARD.

Witnesses:
ALLEN WEBSTER,
F. J. MILLEA.